April 17, 1962  L. M. BOYD  3,030,072
TORQUE LIMITING WICKET GATE OPERATING
MECHANISM FOR HYDRAULIC TURBINES
Filed Dec. 7, 1959  2 Sheets-Sheet 1

Fig. I

INVENTOR
L. M. BOYD
By Featherstonhaugh & Co.
Attorneys

April 17, 1962

L. M. BOYD 3,030,072

TORQUE LIMITING WICKET GATE OPERATING
MECHANISM FOR HYDRAULIC TURBINES

Filed Dec. 7, 1959

INVENTOR
L. M. BOYD

By Heatherstonhaugh & Co.
Attorneys

United States Patent Office 3,030,072
Patented Apr. 17, 1962

3,030,072
TORQUE LIMITING WICKET GATE OPERATING MECHANISM FOR HYDRAULIC TURBINES
Lawrence M. Boyd, Senneville, Quebec, Canada, assignor to Dominion Engineering Works Limited, Montreal, Quebec, Canada
Filed Dec. 7, 1959, Ser. No. 857,984
10 Claims. (Cl. 253—122)

This invention relates to hydraulic turbines and, more particularly, to torque limiting devices used in the wicket gate operating mechanism of hydraulic turbines to protect the wicket gates against damage from the full force of the operating mechanism when an obstruction is jammed in the gates.

The control of speed or power output of a hydraulic turbine is commonly achieved by regulating the flow of water through the turbine by use of a system of wicket gates set in the water stream and actuated through a system of links and levers known as the "gate operating mechanism."

One method of limiting the torque has been to provide a shear pin in each wicket gate mechanism which will fail at a predetermined level, limiting the torque which can be supplied to the gate.

Another method has been to provide a breaking link of controlled cross-section which will fail when its ultimate strength has been exceeded, protecting the gate as above.

Again the gate operating mechanism is usually provided with a device to adjust the relative position of each gate with respect to each other, when under control of mechanism, so that all gates will assume corresponding positions as they move under control of the mechanism.

This adjustment is required:
(1) When first assembling the gates and operating mechanism due to small differences in manufacture, and
(2) When the turbine has been in service for an extended period to reset the gates which have fallen out of their original adjustment due to unequal wear.

Again turbines are usually equipped with some means to prevent the gates from damaging themselves as they swing out of control after their torque limiting device has failed. It is not always convenient to shut a turbine immediately down after a gate has broken free and turbines are often called upon to operate for extended periods in this condition.

This control has been achieved by a mechanical stop on the gate lever which prevents the gate swinging into a position when it can foul either the turbine runner or the adjacent gates. Again dampening devices have been provided to restrain the swinging of the gates and reduce the impact as they reach the stops.

Replacement of the broken links to bring the free gates under control and into index is often a laborious operation usually involving shutting down the turbine. Devices have been supplied to permit replacement of the failed link or sheared pin while the turbine runs under load but even with these devices a repair requires a replacement part and the presence of repair personnel at the site. This necessitates a stock of spare parts at all time and in the case of unattended plant will usually require a special trip of the repair personnel to the site.

It is the principal object of the present invention to provide a new and improved torque limited device which will overcome the above disadvantages and in addition provide more accurate control of the limiting torque and, as well, permit certain economies in manufacture.

Another object is the provision of a torque limiting device capable of wide adjustment and very accurate setting.

Another object is the provision of a torque limiting device which, upon failure, requires no replacement parts to restore it to its original setting.

Another object is to provide a torque limiting device which yields sufficiently to prevent injury to the wicket gate when the gate engages an obstruction and which keeps the gate under restraint at all times including after the obstruction has been released by subsequent movement of the gates.

Another object is the provision of a torque limiting device which eliminates need for any adjusting device to accurately position the wicket gates.

Another object is the provision of a torque limiting device which permits resetting of the wicket gates by merely opening the turbine to full gate when stop means movable with the wicket gates are forced against co-operating stop means carried by the head cover of the turbine. It may be noted here that this feature of the invention eliminates need for shutting down the turbine; eliminates need for personnel; and may be achieved at an unattended plant from a remote control point.

Another object of the invention is the provision of a torque limiting device which eliminates any need for accurate indexing of the various parts and reduces the amount of shop assembly required to assure a satisfactory index.

Proceeding now to a more detailed description of the invention, reference will be had to the accompanying drawings, in which—

Figure 1:
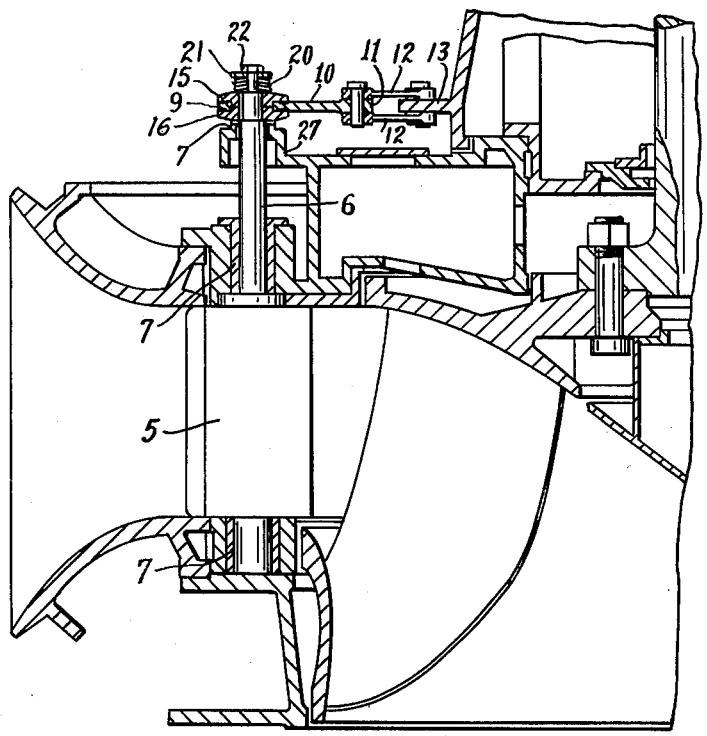
FIG. 1 is a vertical sectional view of a torque limiting wicket gate operating mechanism designed in accordance with the invention.
Figure 2:
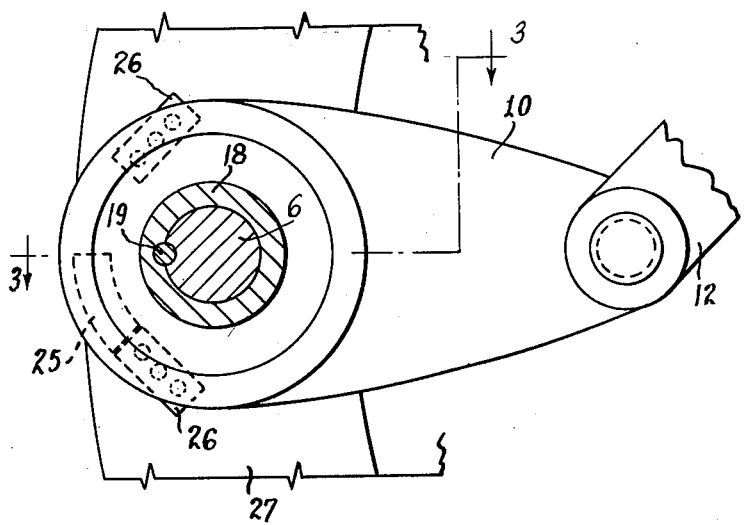
FIG. 2 is a fragmentary sectional view taken substantially along the section line 2—2 of FIG. 3.
Figure 3:
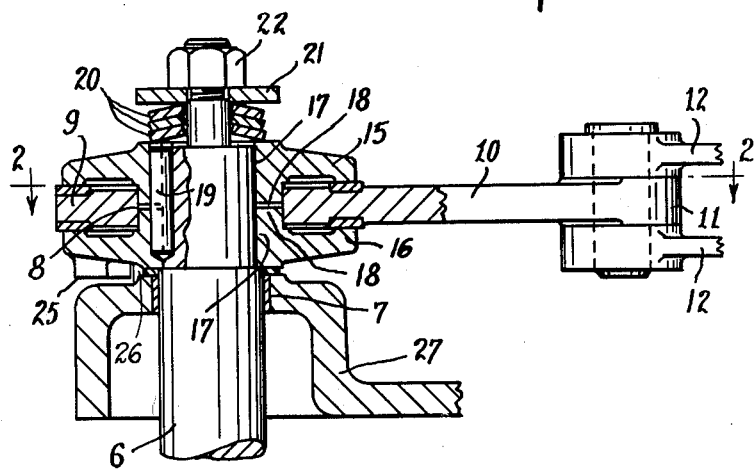
FIG. 3 is a sectional view taken substantially along the section line 3—3 of FIG. 2.

Referring more particularly to the drawings, 5 designates a wicket gate carried by a gate shaft 6 journalled in suitable bearings 7. Shaft 6 passes upwardly and loosely through an opening 8 provided in the gate end 9 of a gate operating lever 10 having its other end 11 connected by links 12 to a conventional gate operating ring 13. The end 9 of lever 10 is centered on and restrained between upper and lower friction discs 15 and 16 provided with openings 17 for the passage of shaft 6 and with annular centering shoulders 18 fitted in the opening 8 of lever 10. The discs 15 and 16 are slidably keyed to shaft 6 as indicated at 19.

A plurality of centrally apertured concave-convex spring washers 20 are stacked one upon the other on the shaft 6 between the central portion of the upper disc 15 and a flat washer 21 bearing against the underside of an adjusting nut 22 threaded onto the upper end of shaft 6. The washers 20 are shown with their concave surfaces facing downwardly and provided, in conjunction with the flat washer 21 and nut 22, what may be termed an extensible compression device which, under adjustment of nut 22, maintains a pressure between the discs 15 and 16 and the end 9 of the lever which is sandwiched between said discs.

In the operation of this invention and due to the friction between the lever 10 and the friction discs 15 and 16, the wicket gate shaft 6, which is keyed to the friction discs, will follow the movements of the lever under normal conditions of operation. The maximum amount of torque which is thus applied to the shaft 6 by swinging movements of lever 10 is determined by the pressure of the discs 15 and 16 against the end of the lever sandwiched therebetween and this, in turn, can be regulated by adjustment of the nut 22. If the gate encounters an obstruction so that the resistance of the gate to turning movement exceeds the predetermined torque due to friction between the lever 10 and the discs 15 and 16, as adjusted by the nut 22, the lever 10 will then move relatively to the disc 15 and 16 and the gate shaft 6. The adjustable torque regulating spring device afforded by the washers 20 and 21 and the nut 22 renders the adjustment insensitive to slight wear between the discs and the lever. A stop lug 25 on the lower disc 16 co-operates with adjustably mounted stops 26 on the turbine head cover 27 to limit movement of the gate 5.

The embodiments of the invention in which an exclusive property or privilege is claimed are defined as follows:

1. In a hydraulic turbine, a torque limiting wicket gate operating mechanism comprising, in combination, a turbine cover, a wicket gate, a gate shaft carrying said gate and rotatably journalled to a portion of the turbine cover in suitable bearings, a gate adjusting ring, a lever provided at one end with an opening, wherein a portion of said shaft passes loosely therethrough, means operatively connecting the other end of the lever to the gate adjusting ring, upper and lower friction discs slidably but non-rotatably fitted on the gate shaft and sandwiching the gate end of the lever therebetween, adjustable resilient pressure applying means acting against at least one of said discs to maintain a predetermined amount of pressure between the discs and the gate end of the lever, and coacting stop members carried by at least one of said discs and by the turbine cover to limit the movement of the gate.

2. A torque limiting wicket gate operating mechanism as set forth in claim 1 in which the discs are provided with annular centering shoulders fitted in said lever opening between the lever and the portion of the shaft passing therethrough.

3. A torque limiting wicket gate operating mechanism as set forth in claim 1 in which the adjustable resilient pressure applying means comprises a nut threaded on the shaft and a plurality of concavo-convex spring washers arranged on the shaft between the nut and one of said friction discs and adapted to apply an amount of pressure to the engaging friction disc which is dependent upon the setting of said nut.

4. In a hydraulic turbine, a torque limiting wicket gate operating mechanism comprising, in combination, a turbine cover, a wicket gate, a gate shaft carrying said gate and rotatably journalled to a portion of the turbine cover in suitable bearings, a gate adjusting ring, a lever provided at one end with an opening, wherein an upper portion of the shaft loosely passes therethrough, means operatively connecting the other end of the lever to the gate adjusting ring, upper and lower friction discs slidably keyed to said shaft and sandwiching the gate end of the lever therebetween, the lower disc being supported against downward movement, adjustable resilient pressure applying means arranged on the shaft above the upper friction disc and exerting downward pressure on said upper friction disc to maintain a predetermined pressure between the two discs and the gate end of the lever, and co-acting stop members carried by at least one of said friction discs and by the turbine cover to limit movement of the gate.

5. A torque limiting wicket gate operating mechanism as set forth in claim 4 in which the adjustable resilient pressure applying means comprises a nut threaded on the upper end portion of the shaft and a plurality of concavo-convex spring washers stacked one upon the other on the shaft between the nut and the upper friction disc and adapted to exert an amount of downward pressure on the upper friction disc which is variable by adjustment of said nut.

6. A torque limiting wicket gate operating mechanism as set forth in claim 5 in which the concavo-convex washers are arranged with their concave surfaces facing downwardly.

7. A torque limiting wicket gate operating mechanism as set forth in claim 5 including a flat washer interposed between the nut and the uppermost of said concavo-convex spring washers.

8. In a hydraulic turbine, a torque limiting wicket gate operating mechanism comprising, in combination, a turbine cover, a wicket gate, a gate shaft carrying said gate and rotatably journalled in suitable bearings with the upper portion of the shaft passing upwardly through the turbine cover, a gate adjusting ring, a lever provided at one end with an opening, wherein therethrough the portion of the shaft extending upwardly through the turbine cover passes therethrough, means operatively connecting the other end of the lever to the gate adjusting ring, upper and lower friction discs slidably keyed to said shaft and sandwiching the gate end of the lever therebetween, the lower disc being positioned above and supported by the turbine cover, co-acting stop members carried by the lower friction disc and by the turbine cover to limit movement of the gate, a nut threaded onto the upper end of said shaft, a plurality of concavo-convex spring washers arranged on the shaft between the nut and the central portion of the upper friction disc with the concave sides of the washers facing downwardly and a flat washer positioned on the shaft above the uppermost of the concavo-convex washers and bearing against the underside of said nut.

9. A torque limiting wicket gate operating mechanism according to claim 1 wherein the co-acting stop members comprise at least one lug carried by the said at least one of said discs, and at least one other lug carried by the turbine cover.

10. A torque limiting wicket gate operating mechanism according to claim 1 wherein the co-acting stop members comprise two lugs carried by the turbine cover, and at least one additional lug carried by the said at least one of said discs, said additional lug being positioned between and co-acting with the two lug carried by the turbine cover.

References Cited in the file of this patent

UNITED STATES PATENTS

| 551,177 | Bernard | Dec. 10, 1895 |
| 579,208 | Wolff | Mar. 23, 1897 |
| 986,311 | Pollock | Mar. 7, 1911 |
| 1,607,773 | Moody | Nov. 23, 1926 |
| 2,525,379 | Smilansky | Oct. 10, 1950 |
| 2,726,524 | Gorin | Dec. 13, 1955 |
| 2,862,376 | Thelander | Dec. 2, 1958 |

FOREIGN PATENTS

| 13,298 | Austria | Sept. 10, 1903 |
| 21,272 | Norway | Feb. 27, 1911 |